(12) United States Patent
Everett

(10) Patent No.: US 9,536,447 B2
(45) Date of Patent: Jan. 3, 2017

(54) PLAYING AID FOR A STRINGED INSTRUMENT

(71) Applicant: Kenneth Walter Everett, Southampton (GB)

(72) Inventor: Kenneth Walter Everett, Southampton (GB)

(*) Notice: Subject to any disclaimer, the term of this patent is extended or adjusted under 35 U.S.C. 154(b) by 0 days.

(21) Appl. No.: 14/438,306

(22) PCT Filed: Oct. 21, 2013

(86) PCT No.: PCT/GB2013/000444
§ 371 (c)(1),
(2) Date: Apr. 24, 2015

(87) PCT Pub. No.: WO2014/072669
PCT Pub. Date: May 15, 2014

(65) Prior Publication Data
US 2015/0302759 A1    Oct. 22, 2015

(30) Foreign Application Priority Data
Nov. 6, 2012  (GB) .................................. 1219953.5

(51) Int. Cl.
*G09B 15/06*    (2006.01)
*G10D 3/06*    (2006.01)

(52) U.S. Cl.
CPC ................. *G09B 15/06* (2013.01); *G10D 3/06* (2013.01)

(58) Field of Classification Search
CPC ..................................... G10D 3/06; G10D 1/08
USPC ........................................... 84/267, 290, 293
See application file for complete search history.

(56) References Cited

U.S. PATENT DOCUMENTS 4,621,558 A    11/1986    Cornette
6,271,448 B1    8/2001    Steinberger

FOREIGN PATENT DOCUMENTS

WO    WO2009/134494    11/2009

*Primary Examiner* — Kimberly Lockett
(74) *Attorney, Agent, or Firm* — Wenderoth, Lind & Ponack, L.L.P.

(57) ABSTRACT

A playing aid for a stringed instrument comprises an alignment means arranged in use to be located on the neck of the instrument. The alignment means comprises a linear alignment element arranged in use to extend substantially parallel to the longitudinal axis of the neck of the instrument. The aid further comprises a glider comprising having a collar arranged to receive a part of the player's hand. The aid further comprises a coupling means arranged to couple the glider slid-ably to the linear alignment element of the alignment means.

19 Claims, 17 Drawing Sheets

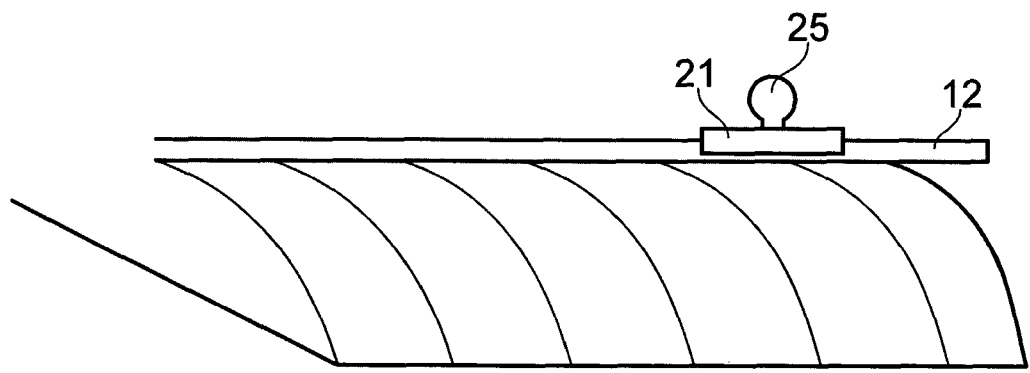
FIG. 11
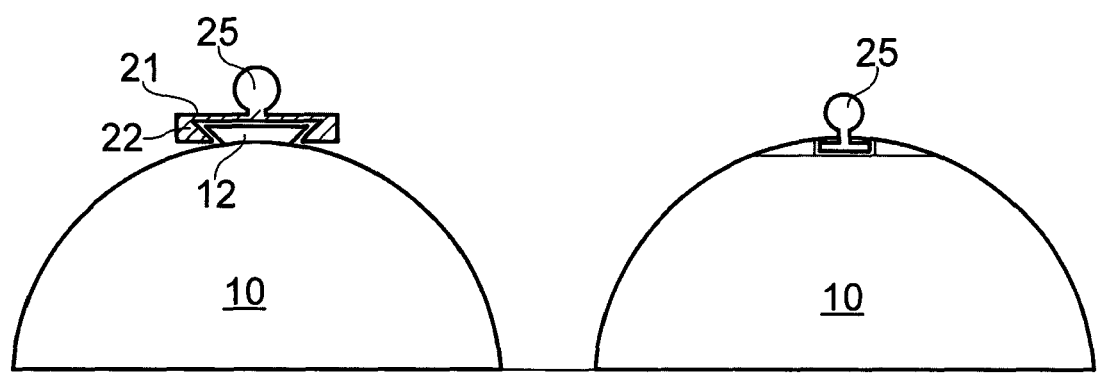
FIG. 12                    FIG. 13
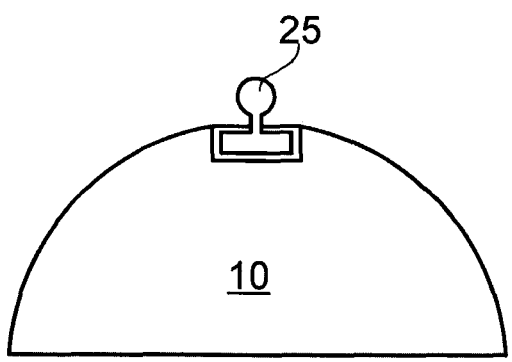
FIG. 14

PLAYING AID FOR A STRINGED INSTRUMENT

FIELD OF THE INVENTION

The present invention relates to playing aids or accessories for stringed instruments such as a guitar, banjo or violin, in particular to a hand positioning device to assist players to learn correct hand positioning on the neck of the instrument.

BACKGROUND

Correct hand positioning on the neck of the instrument is essential to learning to play the instrument well. This is traditionally learned by practice and teaching but poor positioning habits are hard to correct and may ultimately limit a player's ability to progress to higher skills. An aid to learning correct positioning, and to aid musicians' muscle memory, would have value both to players and commercially.

PRIOR ART

The prior art contains many variants of the capotasto, used mounted on an instrument's neck to stop one or more strings and so alter the tuning. In some variants the capotasto comprises keys or buttons to control the stopping of each string, so making chords easier to play. In some designs, the capotasto is adapted to be movable along the neck, for example by means of a movable fitment or mount on the neck. Rollers may contact the strings to effect the tuning change. In each case, the apparatus is designed to and has the sole purpose to effect a change in tuning or stopping of the strings, rather than to guide a player's hand in stopping the strings without mechanical assistance. Guitar slides are well known which work on a player's finger or hand in order to stop strings and to produce glissando or portamento effects. These too are intended to control the nature of the sound, rather than to aid playing in a naturally stopped manner.

Accordingly, a number of patents in this field have been filed in order to solve the problem of the need for a movable capotasto (also referred to as a 'capo'), including the following:

U.S. Pat. No. 6,271,448 discloses a sliding Capo for a musical instrument of the lute family which rides in a track in the neck of the instrument. The Capo includes a rigid cross piece holding elongated flanges which ride in the track. A cylindrical elastomeric roller runs in bearings carried by the cross piece, and adjustment means are provided for adjusting the height of the roller above the fingerboard. In the case of curved fingerboards, the shaft on which the roller runs is flexible and springy, so that it can bend and the cylindrical roller can press all strings to the fingerboard.

U.S. Pat. No. 4,621,558 discloses a rolling capo device [that] comprises two rollers movable along the neck of a guitar. The top roller presses the strings at any of several frets in order to facilitate playing in various keys. The rollers fit the cross-sectional curvature of the neck, thus maintaining a true transverse position and facilitate a smooth travel of the device up and down the neck.

In contrast the present invention provides a playing aid that does not bear upon the strings, distinct from a capotastpo, usable to assist positioning of the player's hand on the neck.

SUMMARY OF THE INVENTION

According to a first aspect of the present invention there is provided a playing aid for a stringed instrument comprising:

an alignment means arranged in use to be located on the neck of the instrument, the alignment means comprising a linear alignment element arranged in use to extend substantially parallel to the longitudinal axis of the neck of the instrument;

a glider having a collar arranged to receive a part of a player's hand; and a coupling means arranged to couple the glider to the linear alignment element of the alignment means so that the glider is able to slide with respect to the neck.

In this way a musician may place a part of their hand, for example their thumb into the collar and the playing aid positions the hand correctly to assist in playing the instrument. The hand may then move up and down the neck of the instrument, guided by the glider running on the linear alignment element, while maintaining the correct playing position. In preferred embodiments the collar is adapted to receive the musician's thumb, though in some embodiments the collar may be adapted to receive part of the player's hand, and may be in the form of a partial glove to fit the hand. Herein the collar will be referred to as a thumb collar, though this is in no way intended to limit the scope of the invention.

In a preferred embodiment the alignment means is mounted on the neck and comprises at least a first mounting means and the linear alignment element formed or mounted on the mounting means.

In further preferred embodiments the alignment means comprises a first and a second mounting means and a linear alignment element extending between them. Preferably the mounting means are adapted to be placed at a first position high up the neck closer to the body of the instrument and a second position lower down the neck further from the body of the instrument. In some embodiments the first mounting means has larger dimensions than the second mounting means in order to accommodate a tapering profile of the neck. Preferably the mounting means comprise a concave profile on the surface that is arranged to come into contact with the neck to allow a stable fit. The mounting means may be composed of a compliant material in order to allow flexibility to conform to the shape of the neck.

In some embodiments a mounting means is adapted to be semi-permanently attached to the neck, for example by means of screws or studs inserted into the neck or adhesives. In preferred embodiments a mounting means is adapted to be detachable from the neck. In alternative embodiments the mounting means is adapted to be detachable from the linear alignment element.

A detachable means by which the linear alignment element may mount on the neck is by means of clips, in some embodiments extending around the rear of the neck and a portion of the fretboard, acting in use to clip the mounting means in place while not impeding access to the strings. In some embodiments the mounting means may be held in place using clamps, for example having a screw-clamping action. In further embodiments the mounting means may comprise a removable attachment material such as Velcro®.

In some embodiments the mounting means comprises the linear alignment element, and the glider slid-ably couples directly to the mounting means. In one embodiment the mounting means comprises an extended body adapted to be mounted on the neck and having a recess formed within it having a profile with a return, the coupling means comprising a projection shaped to be retained by the return.

The return is a part of the recess profile that fits around a projection on a coupling to slid-ably retain the coupling in the recess.

In this way the glider may slide along the length of the recess, while being coupled to the mounting means.

In one embodiment the mounting means comprises a concave curved profile adapted to fit against the neck. The mounting means may be attached to the neck by the attachment means described above. The recess may have a variety of cross-sectional profiles having a return, for example most of the circumference of a circle, a rectangle or other shape formed the mounting means.

In preferred embodiments the linear alignment element comprises a rail extending from a single mounting means, or between two mounting means, and the glider slid-ably couples to the rail. In one embodiment the rail has a flat rectangular cross-section with the flat parallel to the neck in use, and the glider has a recess having two returns adapted to fit around the rail. The glider is slid-ably coupled to the rail and the rail is retained in the recess by the returns.

In one embodiment the rail has a profile having a tee shaped section and glider comprises a recess adapted to fit around the rail and having a return profile in the recess, such that the glider is retained on the rail. In an alternative embodiment the rail may comprise a recess having two returns, and the glider may comprise a stud profile that fits within the recess and is retained by the returns and the head of the stud. In a further embodiment the rail is a substantially circular cross-section rod, and the glider has a substantially circular clearance hole through it and is mounted on the rod. A variety of arrangements of the glider and rail are usable in the device of the invention. Examples will be apparent to the skilled person, for example in the technology of curtain rails.

In some embodiments the device is adapted such that the glider remains coupled to the rail in use. In preferred embodiments the device is adapted such that the glider couples removably to the rail and is held in place to the rail in a manner which avoids accidental decoupling while playing. Some embodiments may comprise a glider removal point at which the rail is adapted to allow the returns on the glider recess to be removed from the rail. For example, the rail may comprise a cut-out region.

In further embodiments the alignment means is formed on the neck and the linear alignment element is formed on the rear of the neck itself. In a preferred embodiment the linear alignment element comprises a recess formed in the neck having a profile having a return, and the glider has a coupling means having a profile that fits within that return and is retained by it. In one embodiment the alignment means comprises a recess formed in the neck and arranged to extend substantially parallel to the longitudinal axis of the neck so as to contain the linear alignment element having a profile having a return for slid-ably retaining the coupling means. In this embodiment the linear alignment is element is an extrusion or a folded sheet formed with a recess have a return to slid-ably retain so that the coupling may be slid-ably retained within the recess.

Preferably the recess comprises a glider fitting point at which the coupling mean may be inserted into the recess. In a preferred embodiment the recess has an inverted tee profile within the neck and the coupling means comprises a stud fitting within the tee profile and retained within it, the fitting point comprising a region without the tee profile return, such as a straight sided blind hole intersecting the recess. In this way the stud slides up and down the recess in use, coupling the glider to the neck, the glider being removable when at the fitting point. In such an embodiment the recess may be covered by an insert material, for example a strip of plastic shaped to be a push-fit into the recess.

In some embodiments the collar is permanently coupled to the coupling means, such that to remove the glider from the neck the coupling means is removed from the linear alignment element.

In some embodiments the glider comprises a collar attachment means such that the collar is detachable from the coupling means so allowing the collar to remain on a part of a player's hand such as the thumb while the coupling means remains attached to the instrument. Such a collar attachment means may comprise a press stud and socket. A stud may be fixed to the collar and be detachable from a socket in the coupling means, or the stud may be fixed to the coupling and be detachable from a socket in the collar. The attachment means may comprise a Velcro® attached to the collar and a Velcro® pad attached to the coupling means. In some embodiments the collar attachment means comprises magnetic attachment means.

According to a second aspect the invention provides a method for assisted playing of a stringed instrument comprising the steps of providing a playing aid substantially as described herein. The user may place the thumb or hand into the collar such that the fingers can reach the strings.

According to a third aspect the invention provides a stringed instrument adapted for use with the a playing aid, the stringed instrument comprising an alignment means comprising a linear alignment element extending substantially parallel to the longitudinal axis of the neck of the instrument. Preferably the alignment means comprises a recess formed in the neck and the linear alignment element has a profile having a return for slid-ably retaining a coupling means having a complimentary profile that fits within the recess. Alternatively the linear alignment element comprises a rail extending substantially parallel to the longitudinal axis of the neck of the instrument which is adapted for coupling slid-ably to a coupling means.

According to a fourth aspect the invention provides for making a stringed instrument so as to be suitable for use with a playing aid comprising the steps of forming into or mounting onto the back of the neck of the stringed instrument an alignment means comprising a linear alignment element extending substantially parallel to the longitudinal axis of the neck of the instrument; such that the instrument may be played with a glider having a collar arranged to receive a part of the player's hand; and a coupling means arranged to couple the glider slid-ably to the linear alignment element of the alignment means.

According to a fifth aspect the invention provides a kit of parts for assembly with a stringed instrument, in which the kit of parts comprises: an alignment means arranged in use to be located on the neck of the instrument, in which the alignment means comprises a linear alignment element arranged in use to extend substantially parallel to the longitudinal axis of the neck of the instrument; a glider comprising having a collar arranged to receive a part of the player's hand; and a coupling means arranged to couple the glider slid-ably to the linear alignment element of the alignment means.

The invention has been described by way of examples only and it will be appreciated that variation may be made to the above-mentioned embodiments without departing from the scope of invention.

With respect to the above description and drawings, it is to be realised that the optimum dimensional relationships for the parts of the invention, to include variations in size, materials, shape, and form are deemed readily apparent and are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF FIGURES

FIG. 11 shows on the neck of an instrument a linear alignment element that is a rail to which a coupling ball is attached to slide.

FIG. 12 shows a cross section of a neck of an instrument fixed to a rail to which a coupling ball is attached to slide by a retained element.

FIG. 13 shows a cross section of a neck of an instrument with a flat back attached to a rail and sliding coupling ball.

FIG. 14 shows a cross section of a neck with a routed recess in the back of the neck housing a linear alignment element rail in which a retained element slides.

DETAILED DESCRIPTION OF FIGURES

Figure 1:
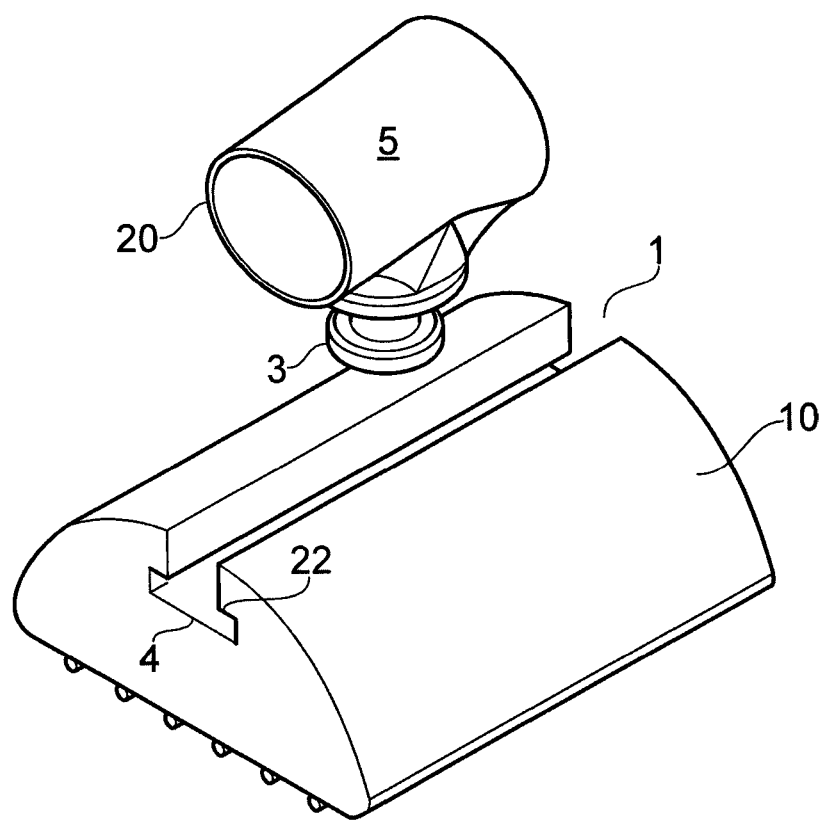
FIG. 1 shows an isometric view of an embodiment of the invention with the glider uncoupled from the instrument.

With reference to FIG. 1 an alignment means comprises a linear alignment element in the form of a recess 1 extends parallel to the longitudinal axis of the neck 10 of an instrument. The recess 1 is formed within the material of the instrument, for example by routing.

In FIG. 1 a glider 20 is shown unattached to the linear alignment element. The glider 20 couples to the alignment means. The glider is also receives a part of a player's hand. The glider 20 comprises a collar 5 connected to coupling means 2 which is circular stud 8 ended by a circular overhang 3.

The recess 1 is adapted to retain a sliding coupling element in the form of a circular stud 2 having an overhang 3 that is retained by the returns 22 on the recess, here shown as an inverted tee profile 4. In FIG. 1 the glider 20 is uncoupled, and the recess 1 is shown in cross-section.

The sliding coupling element is also referred to herein as a retained element because it is retained by the profile of the recess.

Figure 2:
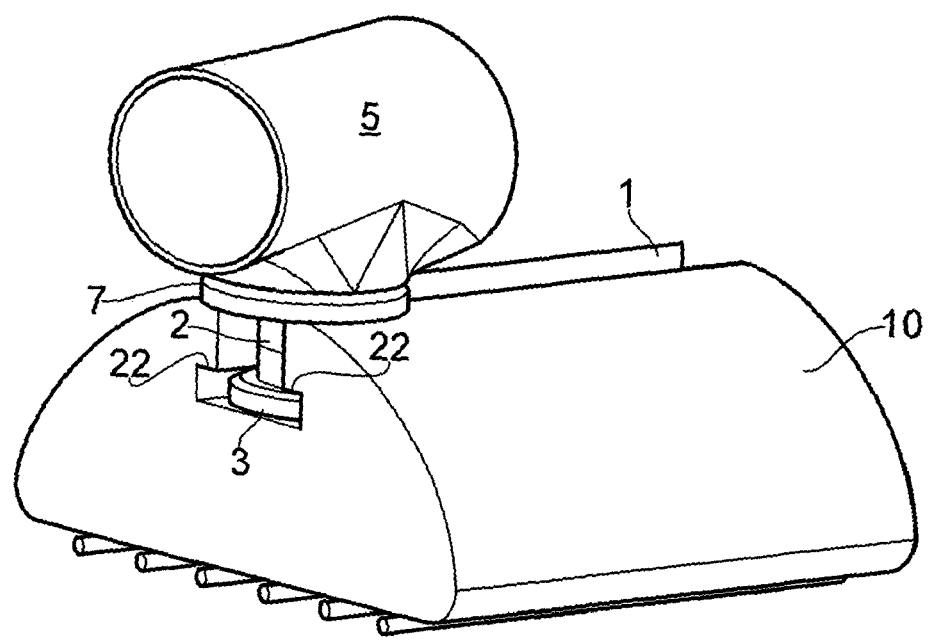
FIG. 2 shows an isometric view of the embodiment in FIG. 1 with the glider coupled to the instrument.

As FIG. 2 shows, the overhang 3 acts to retain the glider 20. The glider 20 can slide parallel to the longitudinal recess and so also parallel to the longitudinal axis of the neck of the instrument. Because the overhang 3 is retained in the recess 1 by returns 22, the overhang 3 cannot be pulled out of the recess 1. The glider 20 is prevented by the overhang 3 from being pulled away from the neck 10 of the instrument.

Figure 3:
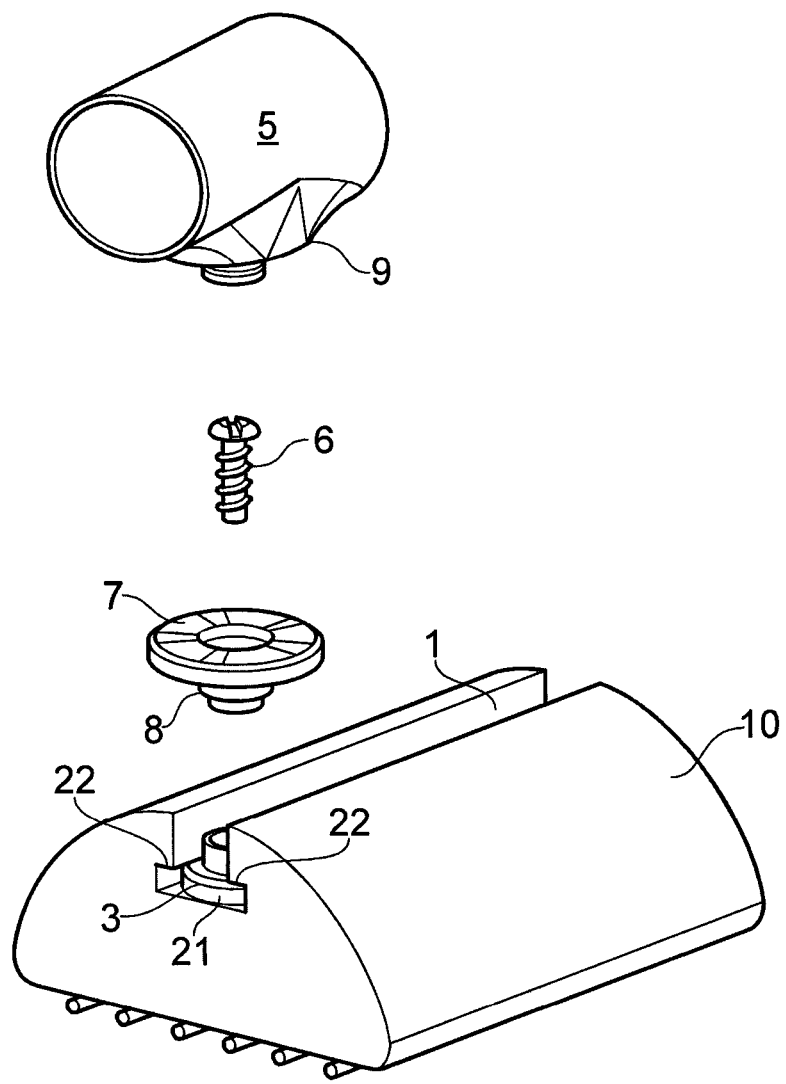
FIG. 3 shows an exploded view of the embodiment in FIG. 2.

In FIG. 3 the overhang 3 is evident as part of a separate retained element 21 which is retained in the recess 1 in the neck 10 by the profile of the recess.

A fitting point in the recess 1 is provided. The returns 22 are removed from the recess 1 at the fitting point so that the recess has a straight sided portion (not shown). The space between the straight sides at the fitting point is sized to clear the overhang 3 on the stud 2. This allows the overhang 3 of the stud 2 to be inserted vertically into the recess 1 at the fitting point and then slid along the recess where the overhang 3 is retained by the returns 22.

The glider 20 comprises collar 5 which is tube adapted for a thumb grip. The collar 5 is attached to the circular stud 2. The thumb grip is a short [40 mm] rubber tube with a perforation for the circular stud 2 to protrude through. Various sizes of the tube can be supplied to fit various thumb sizes.

Alternatively the collar 5 is plastic that is moulded or wood that is cut to fit the contour of a player's thumb or other part the player's hand.

Figure 7:
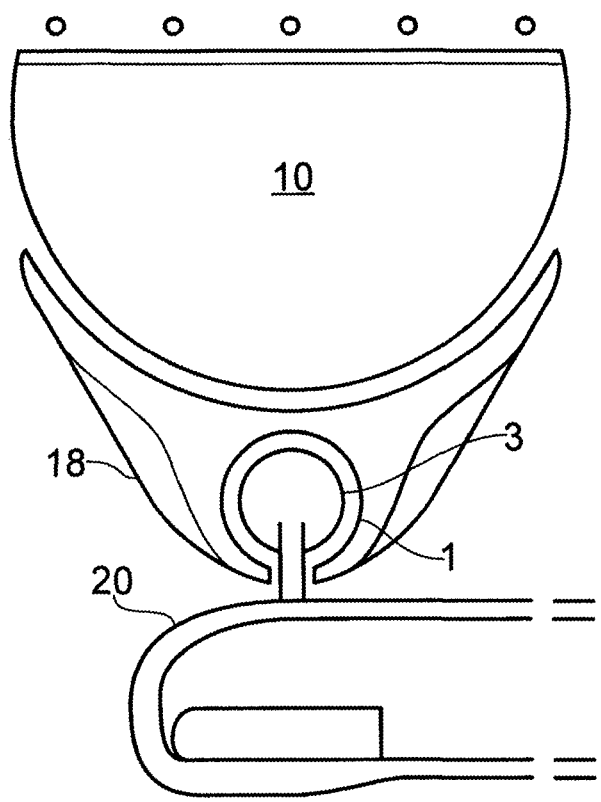
FIG. 7 shows a cross-section view of a further embodiment of the invention.
Figure 9:
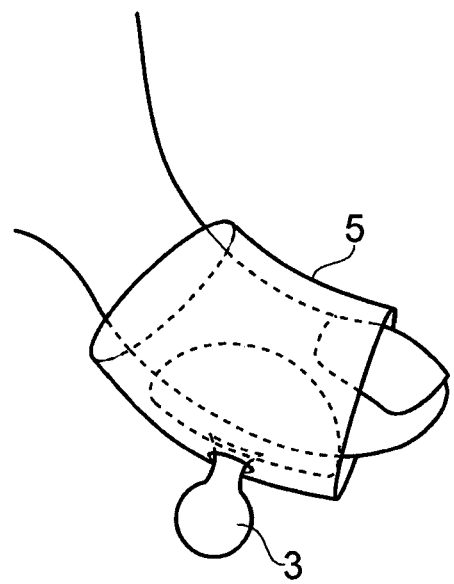
FIG. 9 shows on a thumb a collar with a coupling ball.
Figure 10:
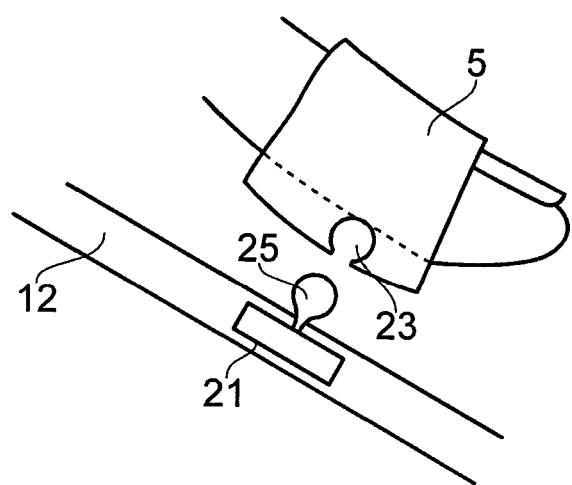
FIG. 10 shows on a thumb a collar with a coupling socket.

The collar 5 is shaped to accommodate the user's thumb and tapered to make a comfortable fit and having a structure to position the thumb alongside the recess 1 at a comfortable distance. FIGS. 7, 9, and 10 illustrate a collar in use on a thumb.

With the glider coupled to the back of the stringed instrument the collar the closest distanced between the collar and the neck is about 5 mm to 15 mm. Preferably the closest distance is no more than 10 mm. More preferably it is no more than 5 mm. An advantage of forming the recess 1 and thus the linear alignment element 12 into the back of the neck 10 is the collar 5 of the glider 20 is brought close to the back of the neck 10.

An advantage of the collar being close to the neck is that a person grasping the instrument with the playing aid using their thumb can easily reach around the neck with their fingers. This advantage is particularly crucial for children learning to play a stringed instrument. Another advantage is that bringing the collar closer better aligns the centre point of pull [ball & socket], with the centre point of resistance the sides of the recess, to achieve smooth movement.

In FIG. 2 the glider 20 is shown slid-ably coupled to the neck 10 of the instrument. As the matching stud 3 slots into the recess 1 so as to slide along the recess 1 with the tee profile 4.

With reference to FIGS. 2 and 3, the playing aid includes a glider comprising from top to bottom: the thumb collar 5, a fixing screw 6, a coupling means upper component comprising a spacer disc 7 to set in part the thumb height position and to present a known friction against the wood of the neck 10, and a coupling means stud 8 to retain the coupling means in the recess. The thumb collar 5 comprises a screw fixing point 9.

In the embodiment of FIGS. 1 to 3 the thumb collar 5 may be formed from a flexible or padded rigid upper to accommodate the thumb, for example having a fabric, stretch fabric or plastic, elastomer or rubber component.

The base of the thumb collar 5 comprises a screw fixing point 9 that comprises a rigid or semi-rigid material to retain the screw 6 head and to provide a solid cushion for the thumb. The coupling means spacer disk 7 and the stud 8 may be formed from for example metal or engineering plastic, for example by moulding, and the screw is preferably metal. The thumb collar may be provided in a range of sizes to suit different users, and spacers may be provided to set the thumb height. In alternative embodiments the thumb collar 5 may be replaced by a hand collar, for example fitting across a portion of the palm, or resembling a glove.

FIGS. 7 and 9 illustrate a ball 3 for coupling collar 5 and thereby the glider 20 to the recess 1 of the linear alignment element. The ball being the retained element that slides along the recess.

The ball 3 is round, oval or otherwise bulbous in order to that the glider may rotate forward and backwards and side to side with respect to the neck of instrument. This rotational freedom allows a person with their thumb in the collar to comfortably play the stringed instrument.

Figure 4:
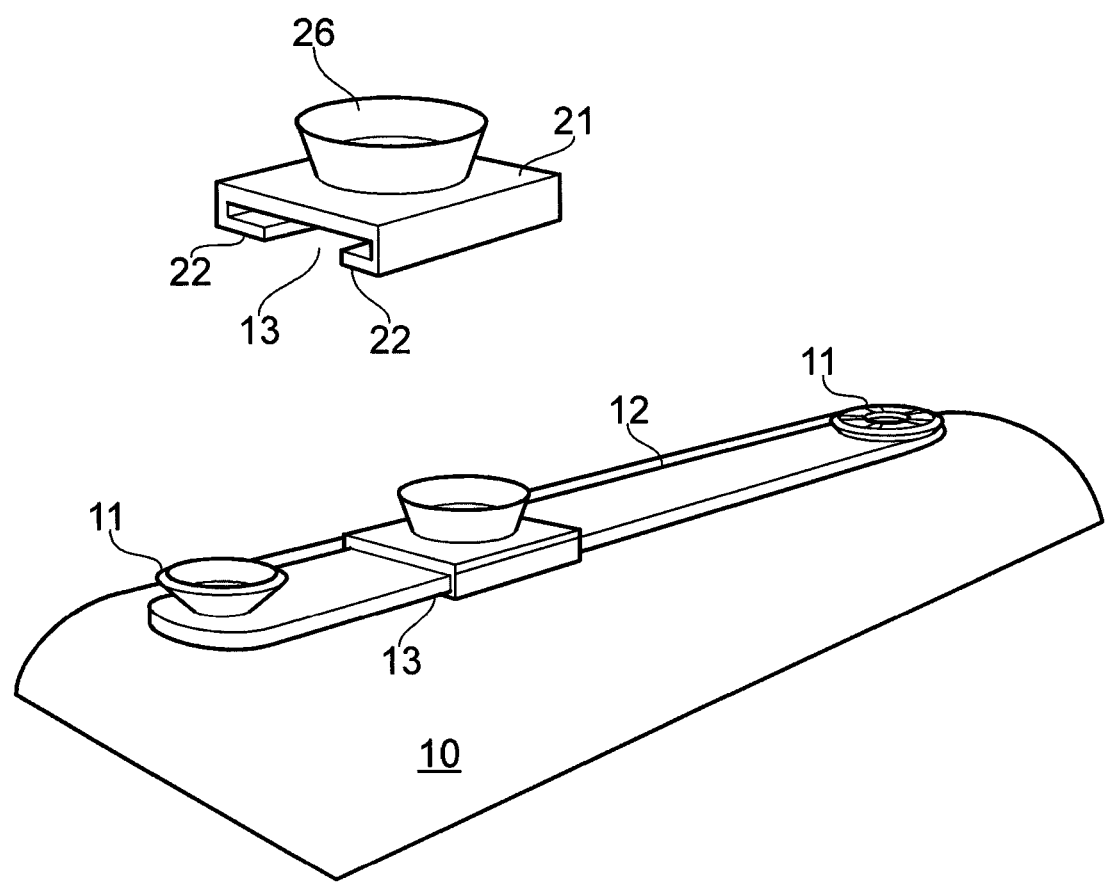
FIG. 4 shows a schematic view of a further embodiment of the invention.

With reference to FIG. 4, the playing aid is adapted to be mounted on the rear of the neck of the instrument 10, in a less invasive way than for the previous embodiment. The alignment means comprises a first and a second mounting means in the form of raised pillar-like elements 11 that are fixed to the neck 10 and a linear alignment element in the form of a bar or rail 12 extending between them. The rail 12 is shown in FIG. 4 as a flat section strip but may take other forms, for example a circular cross section rod. The rail 12 is held clear of the neck 10 in order that the glider may run along the rail. The glider 20 comprises a recess 13 within its base adapted to fit over and to hold within it the rail 12. Returns 22 on the glider 20 retain the 20 on the rail 12.

In FIG. 4 only the coupling means of the glider is shown—the thumb collar 5 and fitments may be substantially as shown in FIGS. 1 to 3. In FIG. 4 the mounting means are screwed or pinned to the neck 10. In some embodiments a semi-flexible alignment means is preferred to allow flexibility in the hand movements of the player.

Figure 5:
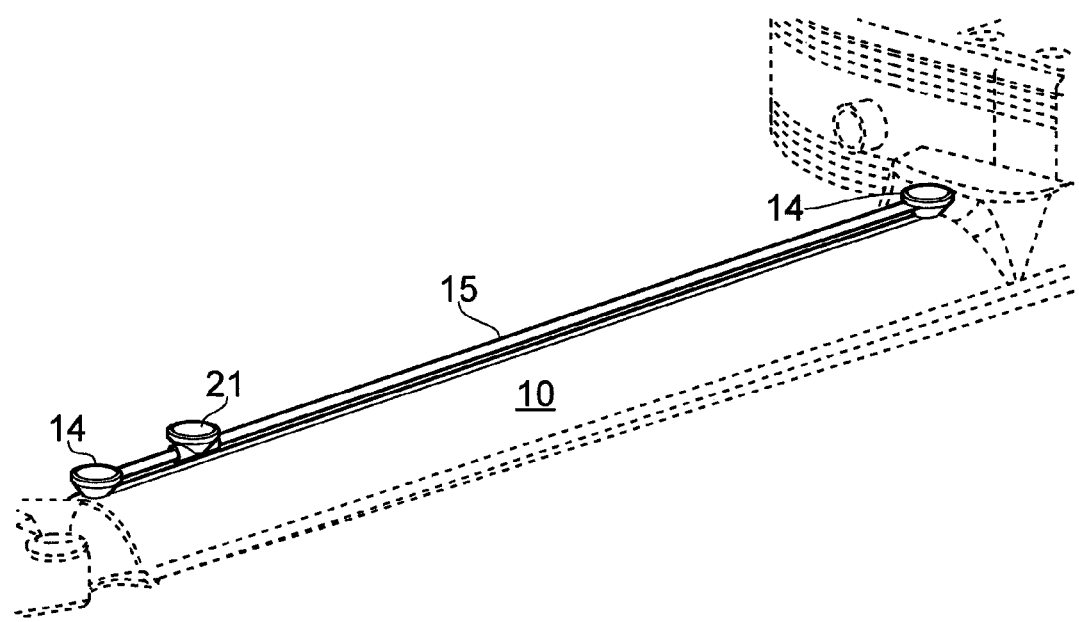
FIG. 5 shows a schematic view of a further embodiment of the invention.

With reference to FIG. 5, the alignment means comprises two mounting means to comprise two clips 14 and a linear alignment element 15 extending between them. Here the mounting means are adapted to clip to the neck 10 and when in place to extend just over the edge of the fretboard. The linear alignment element 15 may comprise a shaped section or rod as 12 in the embodiment in FIG. 4. Preferably the first and the second mounting means 14 are shaped and dimensioned to fit to the neck 10 at their preferred mounting positions, one being slightly larger than the other and shaped to suit the upper neck region and the other smaller and shaped to suit the lower neck region. They may be adapted for a specific instrument or type of instrument. The linear alignment element 15 may be attached to the mounting means for example by bolt or clip on arrangement which may comprise spacers to set the height of the linear alignment element above the neck 10.

The mounting means 14, 11 and the linear alignment element 12, 15 are preferably formed from moulded engineering plastic. In some embodiments the mounting means may comprise a metal spring component and edges articulated to the main body of the mounting means in order to achieve flexing and a strong clip-on force.

Figure 8:
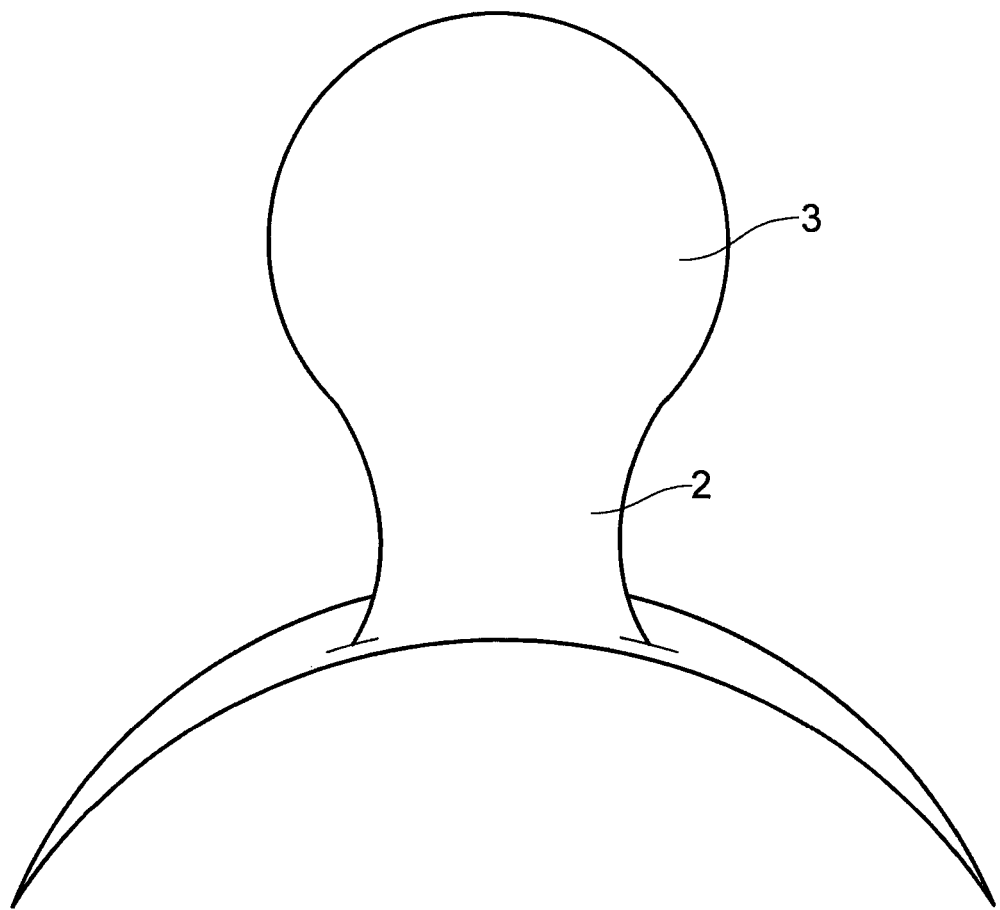
FIG. 8 shows a ball for coupling a collar to linear alignment element.

FIG. 8 shows a circular stud 8 and a ball 3 for coupling a collar to linear alignment element. Preferably the diameter of the ball is about 3 to 9 mm. More preferably it is about 6 mm. The advantage of these dimensions is that the coupling ball does not cause the player's thumb to be too far from the instrument neck in use.

The recess 1 is about a 10 mm deep by about 400 mm long routing into the back of the instrument's neck 10.

As FIG. 8 shows the under sided of the coupling means stud 8 is curved to accommodate the matching curve on the ball of a person's thumb.

FIG. 9 shows the stud 8 and ball 3 of FIG. 8 fixed to a thumb collar 5. So FIG. 8 shows a glider 20 on a player's thumb.

FIG. 10 shows an alternative embodiment of the glider in which the collar 5 comprises a socket 23 to accept a ball 25. The ball 25 is part of a retained element 21 slid-ably connected to rail 12. The rail 12 forms a linear alignment element. The collar 5 with its socket 23 attached to the retained element 21 via the ball 25 form the glider 23.

Advantageously the ball 3, 25, is detachable from the socket 23, 26. A player wearing the collar 5 easily detaches the ball from the socket a relief from the playing position. The player wearing the collar 5 easily attaches the ball into the socket to play the stringed instrument.

FIG. 11 shows the retained element 21 coupled slid-ably to the linear alignment element rail 12. The rail is connected to the back of the neck.

FIG. 12 shows one embodiment of the linear alignment element rail 12 fixed to the neck 10 of the instrument. This embodiment is similar to that illustrated by FIGS. 4 and 5.

Advantageously the rail 12 is fixable to the back of the neck 10 of the instrument without routing a slot in the neck. A player can assemble the playing aid themselves by mounting the alignment means comprising the rail and mounting means to the neck of the instrument.

An advantage of the linear alignment element rail 15 illustrated in FIG. 5 is the circular cross section of the rail. The retained element 21 can rotate around the rail 15. A player whose thumb is coupled to the rail 15 via the collar 5 finds this freedom to rotate provides comfort while playing.

The retained element 21 comprises returns 22 so that the retained element is coupled to the rail so that it can slide along the rail, but not be pulled away from it.

FIG. 13 shows another embodiment of the linear alignment rail 12 fixed to the back of the neck 10. The back of the neck is formed with a flat surface to simplify mounting the rail 12.

The linear alignment element 12 is screwed down, or glued, or attached by clips.

FIG. 14 shows another embodiment of the linear alignment element rail 12 fixed to the back of the neck 10. This embodiment is similar to that illustrated by FIGS. 1 to 3 and FIG. 7 because the alignment means comprises a recess 1 in the neck 10 of the instrument. The different between the embodiments of FIG. 12 versus FIGS. 1 to 3 and 7 is FIG. 12 reveals the ball 25 is fixed permanently to the retained element 21 and in FIGS. 1 to 3 and 7 the ball 3 is fixed permanently to the glider.

An advantage of forming a recess 1 in the neck 10 is that in use the players thumb is close to the back of the neck 10 of the instrument. This makes the instrument easier and more comfortable play, especially for children.

Figure 15:
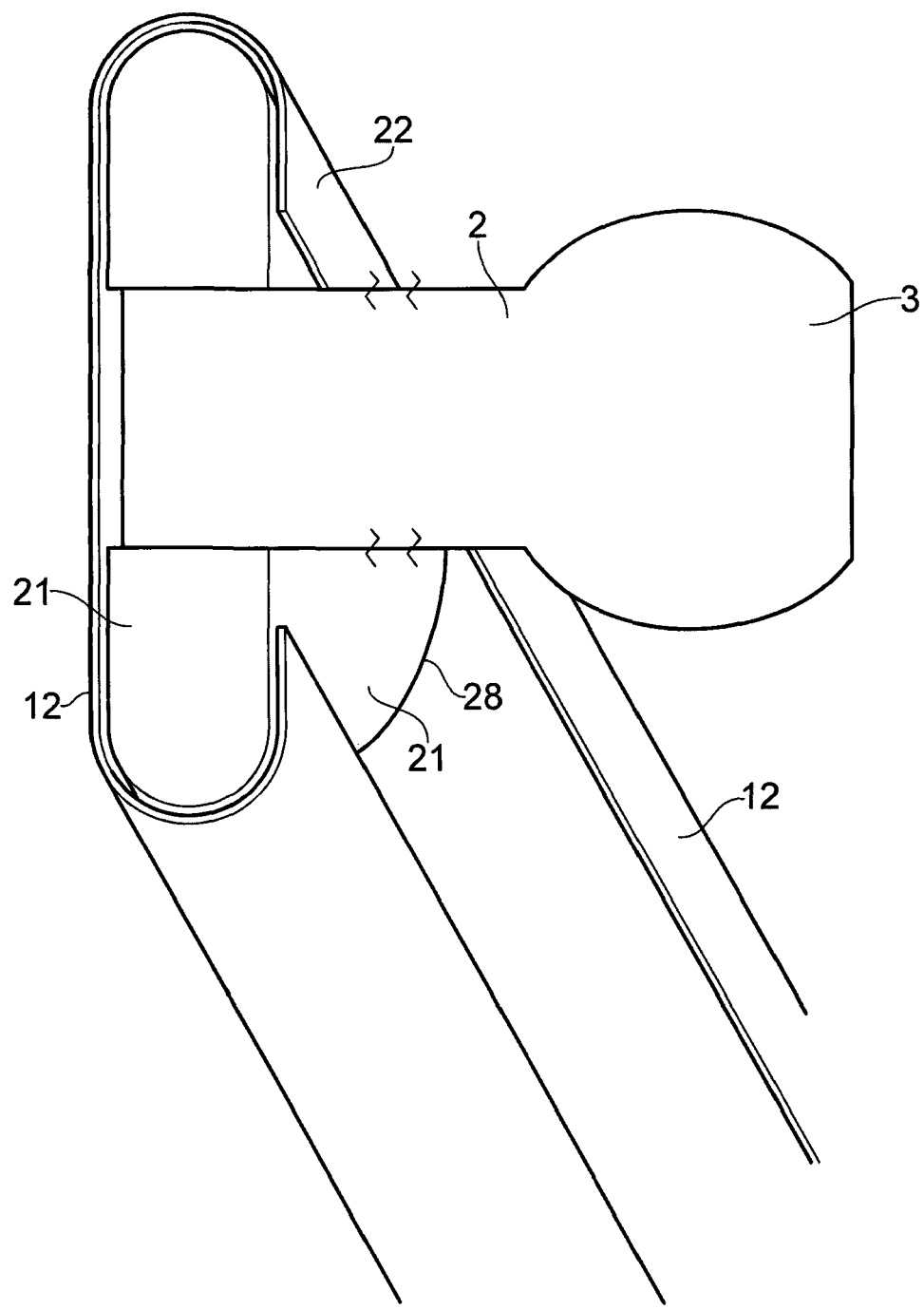
FIG. 15 shows a schematic view of a linear alignment element in which a retained element comprising a coupling ball slides.

FIG. 15 shows more detail of the retained element 21 and the rail 12

The liner alignment element rail 12 ideally is a metal or plastic extrusion or a folded and sheet forming the recess 1. The returns 22 are formed by folding over the edges of the sheet or by an extrusion die to partially close the entrance to the recess 1.

Figure 19:
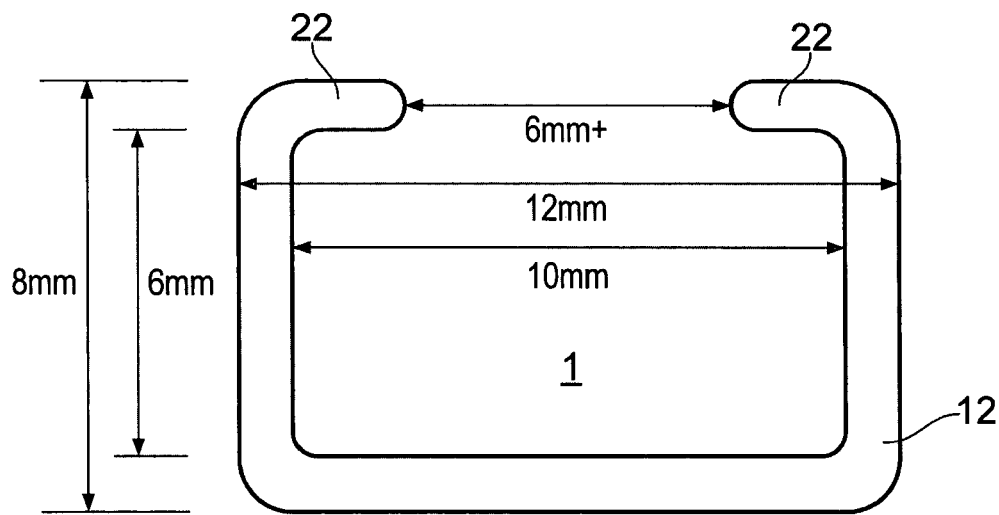
FIG. 19 shows a cross section of a linear alignment element in the form of a folded or extruded rail with recess.
Figure 20:
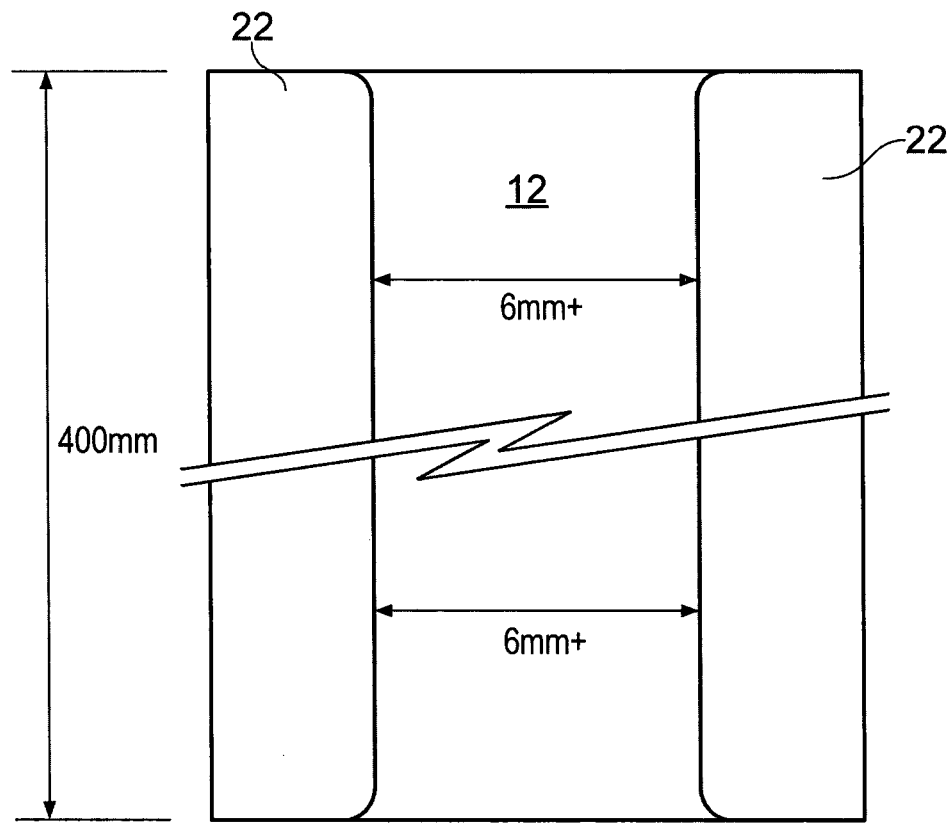
FIG. 20 shows a top view of a linear alignment element.

An advantage of metal is it has long life because it does not wear away as the retained element 21 slides against the walls of the recess 1. And advantage of a recess with plastic or wooden walls is lower cost. FIG. 19 shows a cross section through the linear alignment rail 12. FIG. 20 shows a top view of the rail FIGS. 14 and 15 show an embodiment where the linear alignment element is a rail 12 with a recess 1, and the rail is separate component from the back of the neck 10. FIGS. 1 to 3 and 7 show an embodiment wear the linear alignment element and the recess 1 formed in the back of the neck are one and the same. The advantage for the embodiment in FIGS. 1 to 3 is a component is obviated. The advantage of the embodiment in FIGS. 14 and 15 is durable rail to resist the wearing action of the sliding retained element 21.

Figure 16:
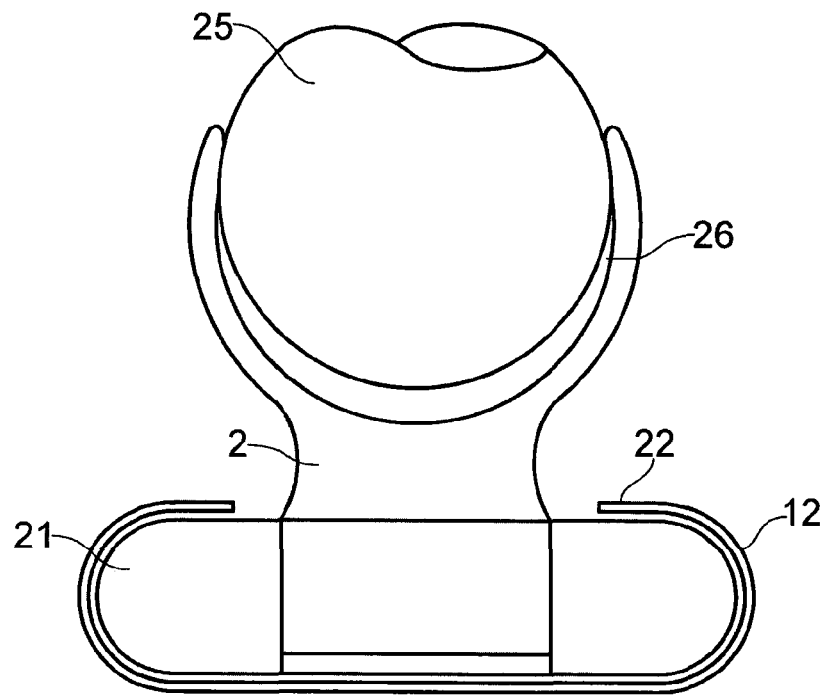
FIG. 16 shows a cross section of a linear alignment element in which a retained element comprising a coupling socket coupled to coupling ball slides.

FIG. 16 shows an alternative embodiment of a retained element 21 comprising a socket 23 adapted to receive the ball 3 fixed to the collar illustrated in FIG. 9. It is related to the embodiment of FIGS. 4 and 5 in that there is a socket 23 in the retained element 21 slid-ably attached to the rail 12. Returns 22 retain the retained element in the recess 1 of the rail 12 as the retained element slides. The socket 26 has an interior profile which matches the bulbous profile of the thumb grip connector ball 3 connected to a thumb collar as shown in FIGS. 7 and 9. The ball 3 conveniently snaps into and out of the socket 26.

Figure 17:
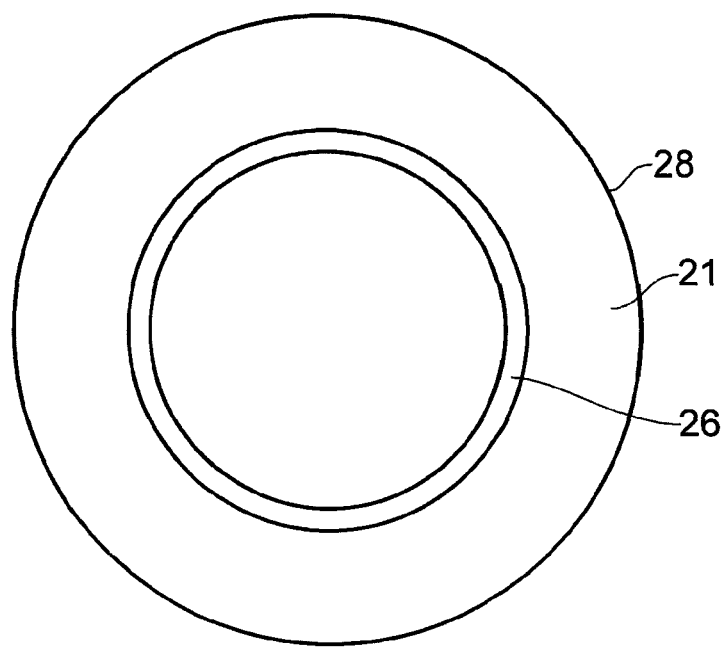
FIG. 17 shows a top view of a retained element comprising a coupling socket.

FIG. 17 shows the top view of the either the retained element 21 in FIG. 15 or the retained element 21 in FIG. 16. Advantageously the perimeter 28 of the retained element 21 is circular. The circular perimeter 28 allows the retained element 21 to slide easily along the recess 1 of the linear alignment element. If the perimeter was flat sided, such as square or rectangular, the retained element could turn crooked in the recess jam with the corners against the sides of the recess.

Figure 18:
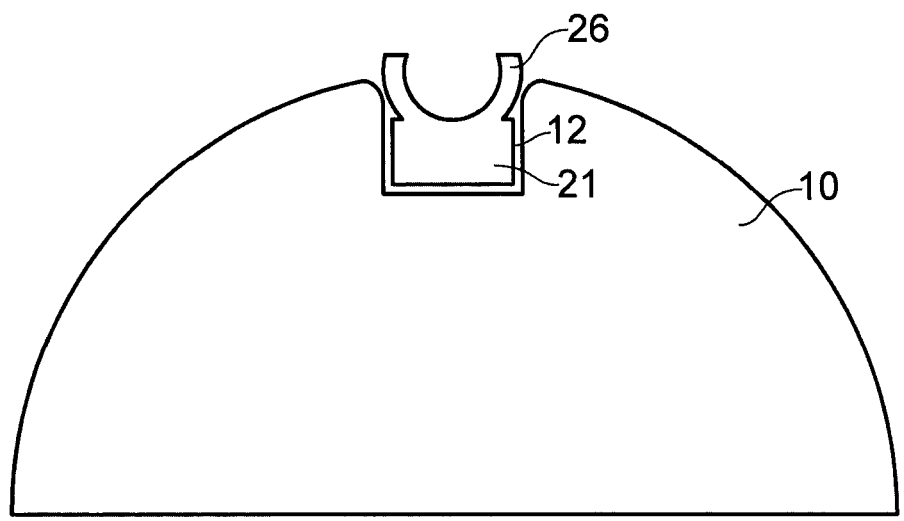
FIG. 18 shows a cross section of a neck of an instrument in which an alignment means is formed from a recess housing a retained element comprising a coupling socket.

FIG. 18 shows a cross section through the neck 10 and retained element 21 in the recess 1 of the linear alignment element rail 12. This cross section is similar to that that shown in FIG. 14 except the retained element comprises a socket 26 to detachably attach to the ball on the collar 5 shown in FIG. 9.

Figure 21:
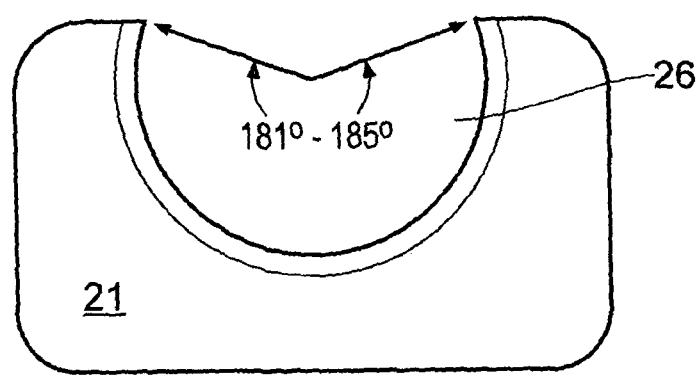
FIG. 21 shows a cross section view through the middle of a retained element comprising a coupling socket.

FIG. 21 shows a cross section of a retained element 21. This is a preferred cross section because the socket 26 sinks into the retained element 21. The top edge of the retained element 21 remains below the returns 22 of the linear alignment rail 12 shown in FIG. 19. Therefore the top edge of the retained element does not protrude above the back of the neck 10 of the instrument when the rail is in the recess 1 of the neck. By contrast the sockets shown in FIG. 16 and FIG. 18 do protrude out of the recess 1 and above the neck of the instrument. An advantage of the retained element 21 shown in FIG. 21 is that the closest distance between the collar and the back of the neck 10 about 1 to 6 mm, and preferably less than 3 mm. This close distance makes it easy for a person playing the instrument with their thumb in the collar 5 to reach around the neck 10 and press the strings with their fingers.

The enclosed angle of the socket 26 is between 181 degrees and 185 degrees of arc so that the ball 3 is clasped by the walls of the recess 1.

Figure 22:
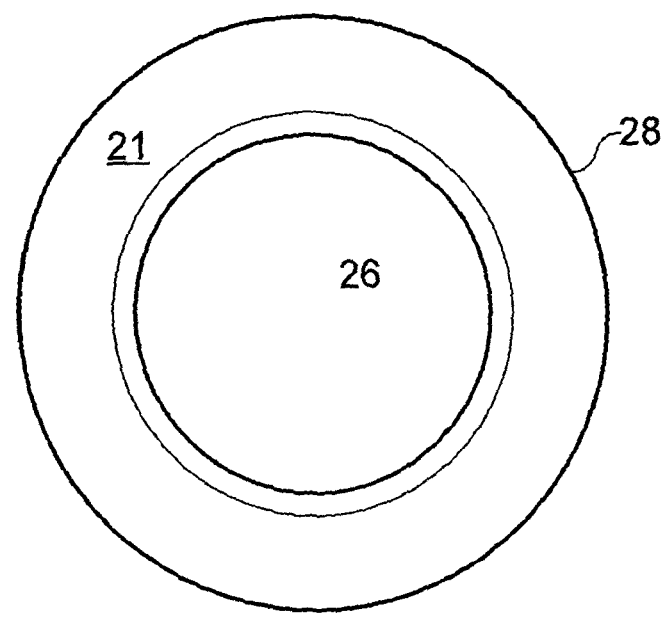
FIG. 22 shows a top view of a retained element with a coupling socket.

FIG. 22 shows that the cross section of the retained element is round. This round perimeter 28 prevents the retained element from jamming in the recess 1 when the player is jamming with the playing aid.

Figure 23:
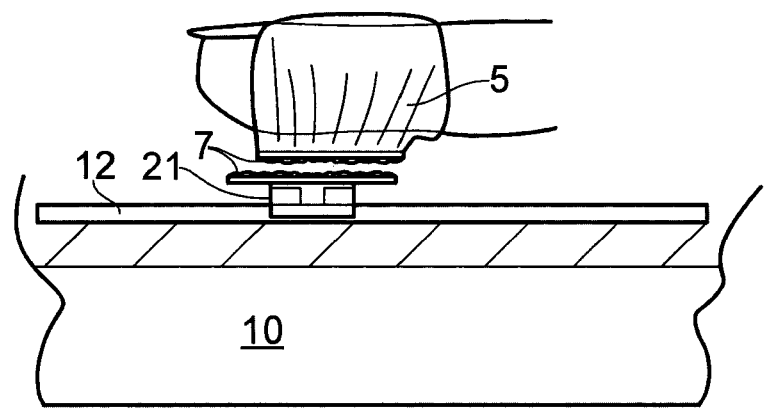
FIG. 23 shows a side view the collar 5 attachable and detachable to the stud 8 of the retained element 21 by Velcro pad 27.

FIG. 23 shows a side view the collar 5 attachable and detachable to the stud 8 of the retained element 21 by Velcro pad 27.

Figure 24:
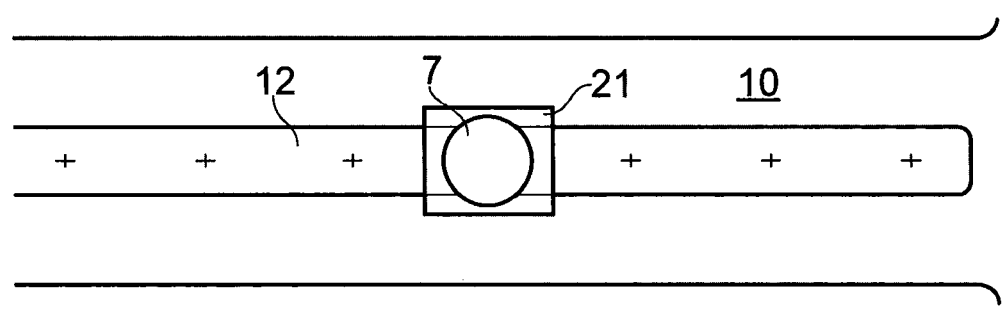
FIG. 24 shows the top view of a pad on the retained element 21 slid-ably attached to the linear alignment element rail 12.

FIG. 24 shows the top view of a pad on the retained element 21 slid-ably attached to the linear alignment element rail 12.

The retained element 22 and thereby the glider 20 travels up and down the neck in the linear alignment element 12. The linear alignment element is about 400 mm long for a typical guitar neck. The length varies for other stringed instruments and usually shorter for violins and longer for cellos.

Figure 25:
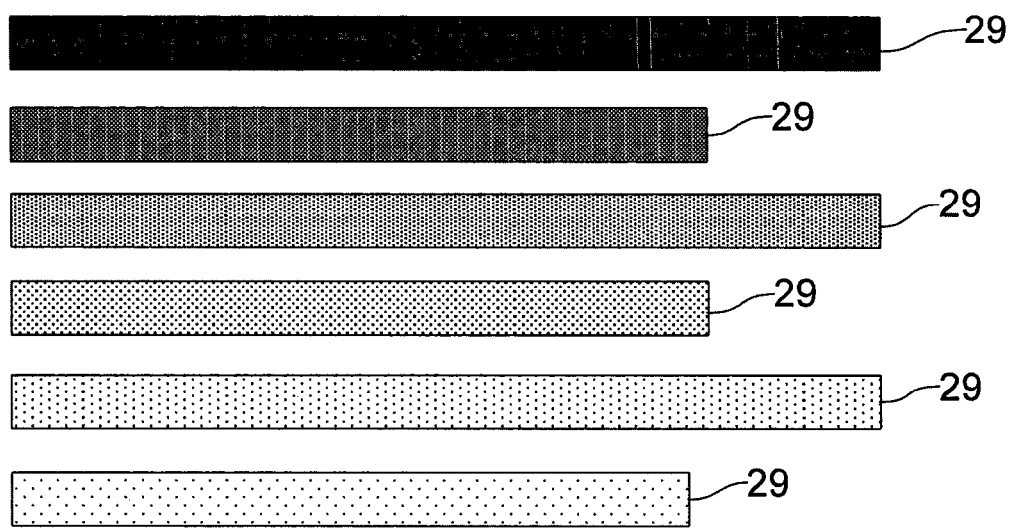
FIG. 25 shows cover strips for covering a recess that extends parallel to the neck of an instrument.

FIG. 25 shows strips 29 of plastic or wood suitable for pressing into the recess 1 to cover it and improve the look of the stringed instrument when the playing aid is not being used.

Figure 6:
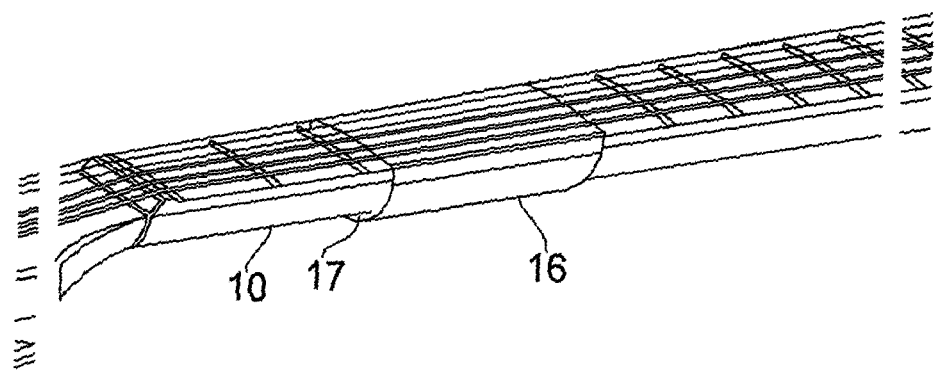
FIG. 6 shows a schematic view of a further embodiment of the invention.

With reference to FIG. 6, the mounting means comprise a nylon/Velcro (Trade Mark) strap 16 that wraps around the guitar neck 10. Attached to the strap 16 is a synthetic bumper 17, preferably formed from a compliant elastomeric material, for example silicone rubber, that keeps the strap in place. The alignment means or glider (not shown in FIG. 6) attaches to the strap or through the strap to the bumper 17 and is not intrusive to the guitar. The alignment means may be substantially as described for previous embodiments.

With reference to FIG. 7, the alignment means comprises a single mounting means in the form of an element 18 having a recess 1 within it adapted to retain a glider 20 having a matching stud 3 as before, the recess here shown as substantially circular in cross section and the stud 3 having a ball-shaped head. The mounting element 18 extends the length of the neck 10 for which the playing assistance is needed and is preferably shaped to fit closely to the back of the neck 10, and may be fixed to the neck 10 for example using Velcro (Trade Mark) on the mounting means and glued to the neck 10.

Features of the various embodiments may be variously combined to build variations of the playing aid.

An index of the labelled parts in the Figures is given below.

| | |
|---|---|
| collar | 5 |
| coupling means | 8 |
| coupling means - ball attached to glider | 3 |
| coupling means - ball on retained element of glider | 25 |
| coupling means - fixed to collar stud with overhang | 2 |
| coupling means - socket in collar of glider | 23 |
| coupling means - socket in retained element of glider | 26 |
| fixing screw | 6 |
| glider | 20 |
| linear alignment element - rail | 12 |
| linear alignment element between mounting means | 15 |
| mounting means | 11 |
| mounting means - bumper | 17 |
| mounting means - clip | 14 |
| mounting means - single | 18 |

-continued

| | |
|---|---|
| mounting means - strap | 16 |
| neck | 10 |
| overhang | 3 |
| recess covering inserts | 29 |
| recess in glider | 13 |
| recess for retaining sliding retained element | 1 |
| recess tee profile | 4 |
| retained element | 21 |
| retained element perimeter | 28 |
| return | 22 |
| screw fixing point | 9 |
| spacer disk | 7 |
| Velcro (trade mark) pad | 27 |

The invention claimed is:

1. A playing aid for a stringed instrument comprising:
an alignment means arranged in use to be located on a neck of the stringed instrument, the alignment means comprising a linear alignment element arranged in use to extend substantially parallel to a longitudinal axis of the neck of the stringed instrument;
a glider having a collar arranged to receive a part of a player's hand; and
a coupling means arranged to couple the glider to the linear alignment element of the alignment means so that the glider is able to slide with respect to the neck.

2. The playing aid as claimed in claim 1, wherein the alignment means comprises a first mounting means, wherein the linear alignment element is formed or mounted on the first mounting means.

3. The playing aid as claimed in claim 1, wherein the alignment means comprises a first mounting means and a second mounting means, wherein the linear alignment element extends between said first mounting means and said second mounting means.

4. The playing aid as claimed in claim 2, wherein the first mounting means is attached to the neck by means of screws or studs inserted into the neck.

5. The playing aid as claimed in claim 2, wherein the first mounting means is adapted to be detachable from the neck.

6. The playing aid as claimed in claim 5, wherein the first mounting means is selected from clips, clamps, and hook and loop portions.

7. The playing aid as claimed in claim 3, wherein the linear alignment element comprises a rail extending between the first mounting means and the second mounting means, and wherein the glider is adapted to be coupled to the rail.

8. The playing aid as claimed claim 2, wherein the first mounting means comprises the linear alignment element and the glider couples directly to the first mounting means.

9. The playing aid as claimed in claim 1, wherein the linear alignment element comprises a recess formed in the neck having a profile with a return, wherein the coupling means has a complimentary profile that fits within said recess and is slid-ably retained by the return.

10. The playing aid as claimed in claim 1, wherein the alignment means comprises a recess formed in the neck and is arranged to extend substantially parallel to the longitudinal axis of the neck so as to contain the linear alignment element, the recess formed in the neck having a profile having a return for retaining the coupling means, whereby the coupling means is able to slide with respect to the linear alignment element.

11. The playing aid as claimed in claim 1, wherein the collar is permanently coupled to the coupling means, such that that to remove the glider from the neck the coupling means is removed from the linear alignment element.

12. The playing aid as claimed in claim 1, wherein the collar is detachable from the coupling means so allowing the collar to remain on the part of the player's hand while the coupling means remains attached to the stringed instrument.

13. A stringed instrument adapted for use with a playing aid as claimed in claim 1, the stringed instrument comprising an alignment means comprising a linear alignment element extending substantially parallel to the longitudinal axis of the neck of the instrument.

14. The playing aid as claimed in claim 12, wherein the alignment means comprises a recess formed in the neck and the linear alignment element has a profile having a return for slid-ably retaining a coupling means having a complimentary profile that fits within the recess.

15. The playing aid as claimed in claim 12, wherein the linear alignment element comprises a rail extending substantially parallel to the longitudinal axis of the neck of the stringed instrument, and adapted for coupling slid-ably to a coupling means.

16. A method of making a stringed instrument so as to be suitable for use with a playing aid, the method comprising
forming into or mounting onto a back of a neck of the stringed instrument an alignment means comprising a linear alignment element extending substantially parallel to a longitudinal axis of the neck of the stringed instrument such that the stringed instrument may be played with a glider having a collar arranged to receive a part of a player's hand; and
a coupling means arranged to couple the glider slid-ably to the linear alignment element of the alignment means.

17. A playing aid kit comprising a kit of parts for assembly with a stringed instrument, in which the kit of parts comprises:
an alignment means arranged in use to be located on a neck of the stringed instrument, wherein the alignment means comprises a linear alignment element arranged in use to extend substantially parallel to a longitudinal axis of the neck of the stringed instrument;
a glider comprising a collar arranged to receive a part of a player's hand; and
a coupling means arranged to couple the glider slid-ably to the linear alignment element of the alignment means.

18. A playing aid as claimed in claim 2, wherein the first mounting means is adapted to be detachable from the linear alignment means.

19. A playing aid as claimed in claim 2, wherein the first mounting means is adhered to the neck.

* * * * *